(12) United States Patent
Bushnell

(10) Patent No.: US 11,746,740 B1
(45) Date of Patent: Sep. 5, 2023

(54) UTILIZING HYDROSTATIC AND HYDRAULIC PRESSURE TO GENERATE ENERGY, AND ASSOCIATED SYSTEMS, DEVICES, AND METHODS

(71) Applicant: John Bushnell, Tacoma, WA (US)

(72) Inventor: John Bushnell, Tacoma, WA (US)

(73) Assignee: John Bushnell, Tacoma, WA (US)

(*) Notice: Subject to any disclaimer, the term of this patent is extended or adjusted under 35 U.S.C. 154(b) by 0 days.

(21) Appl. No.: 18/153,966

(22) Filed: Jan. 12, 2023

(51) Int. Cl.
*F03B 17/02* (2006.01)
*F15B 3/00* (2006.01)

(52) U.S. Cl.
CPC .............. *F03B 17/025* (2013.01); *F15B 3/00* (2013.01); *F05B 2220/709* (2013.01); *F05B 2260/30* (2013.01); *F05B 2260/422* (2020.08); *F05B 2260/60* (2013.01); *F15B 2211/216* (2013.01)

(58) Field of Classification Search
CPC ........ F03B 17/02; F03B 17/025; F03B 17/04; F15B 3/00; F15B 2211/216; F05B 2220/709; F05B 2260/30; F05B 2260/60; F05B 2260/422; F01K 27/00; F01K 27/005; F04B 9/10–115; F04B 9/12–135
See application file for complete search history.

(56) References Cited

U.S. PATENT DOCUMENTS

| | | | | |
|---|---|---|---|---|
| 3,942,323 A | * | 3/1976 | Maillet | ...................... F15B 1/02 60/560 |
| 3,991,574 A | * | 11/1976 | Frazier | ..................... F02G 1/043 60/645 |
| 4,170,876 A | * | 10/1979 | Dits | ..................... F15B 11/0325 60/567 |
| 2002/0149140 A1 | * | 10/2002 | Kitaura | ...................... F16F 9/06 267/130 |
| 2014/0130911 A1 | * | 5/2014 | Chiang | ..................... F03C 1/02 137/565.17 |
| 2015/0192017 A1 | * | 7/2015 | Quiros Morales | .... F04B 53/148 92/62 |
| 2016/0348671 A1 | * | 12/2016 | Candiani | ................... F04B 7/02 |
| 2019/0383260 A1 | * | 12/2019 | Frye | ........................ F03B 17/00 |

FOREIGN PATENT DOCUMENTS

| | | | | |
|---|---|---|---|---|
| ES | 2528334 A1 | * | 2/2015 | |
| FR | 2970747 A1 | * | 7/2012 | .............. F03B 17/02 |
| KR | 20100118181 A | * | 11/2010 | |
| KR | 20140123896 A | * | 10/2014 | ................ F15B 3/00 |
| WO | WO-0240872 A1 | * | 5/2002 | ................ F15B 3/00 |

* cited by examiner

*Primary Examiner* — Mark A Laurenzi
*Assistant Examiner* — Xiaoting Hu
(74) *Attorney, Agent, or Firm* — Perkins Coie LLP

(57) ABSTRACT

Systems, devices, and methods for utilizing hydrostatic and/or hydraulic pressure to generate energy are disclosed herein. A representative industrial system can comprise a storage tank containing fluid, a separator piston having a first separator compartment configured to be fluidically coupled to the storage tank and a second separator compartment, and a pressure intensifier. The pressure intensifier includes a first compartment, and a second compartment fluidically coupled to the second separator compartment. The second compartment of the pressure intensifier includes a pressure concentrator having a housing, a piston head member including arms, a plurality of cylinders each defined in part by the housing, and a drive piston head portion.

20 Claims, 6 Drawing Sheets

UTILIZING HYDROSTATIC AND HYDRAULIC PRESSURE TO GENERATE ENERGY, AND ASSOCIATED SYSTEMS, DEVICES, AND METHODS

TECHNICAL FIELD

This present disclosure relates to utilizing hydraulic and hydrostatic pressure to generate energy. Particular embodiments relate to recovering hydrostatic pressure from industrial storage tanks or pressurized sources to generate compressed fluids for producing energy and/or providing other functions.

BACKGROUND

Industrial facilities often include storage tanks and other related equipment that contain fluid (e.g., fuels, chemicals, etc.) and have significant hydrostatic pressure. While the fluid is utilized within processes of the facilities or sold as product, the hydraulic pressure and potential energy of the fluid and/or storage tanks are often under-utilized or not utilized at all. As a result, the energy associated with the fluid and/or storage tank is wasted. Accordingly, there is a need for systems, devices, and/or methods that can better utilize the hydrostatic pressure of such fluids and/or storage tanks.

BRIEF DESCRIPTION OF THE DRAWINGS

Features, aspects, and advantages of the presently disclosed technology may be better understood with regard to the following drawings. The components in the drawings are not necessarily to scale. Instead, emphasis is placed on illustrating clearly the principles of the present disclosure.

Figure 1:
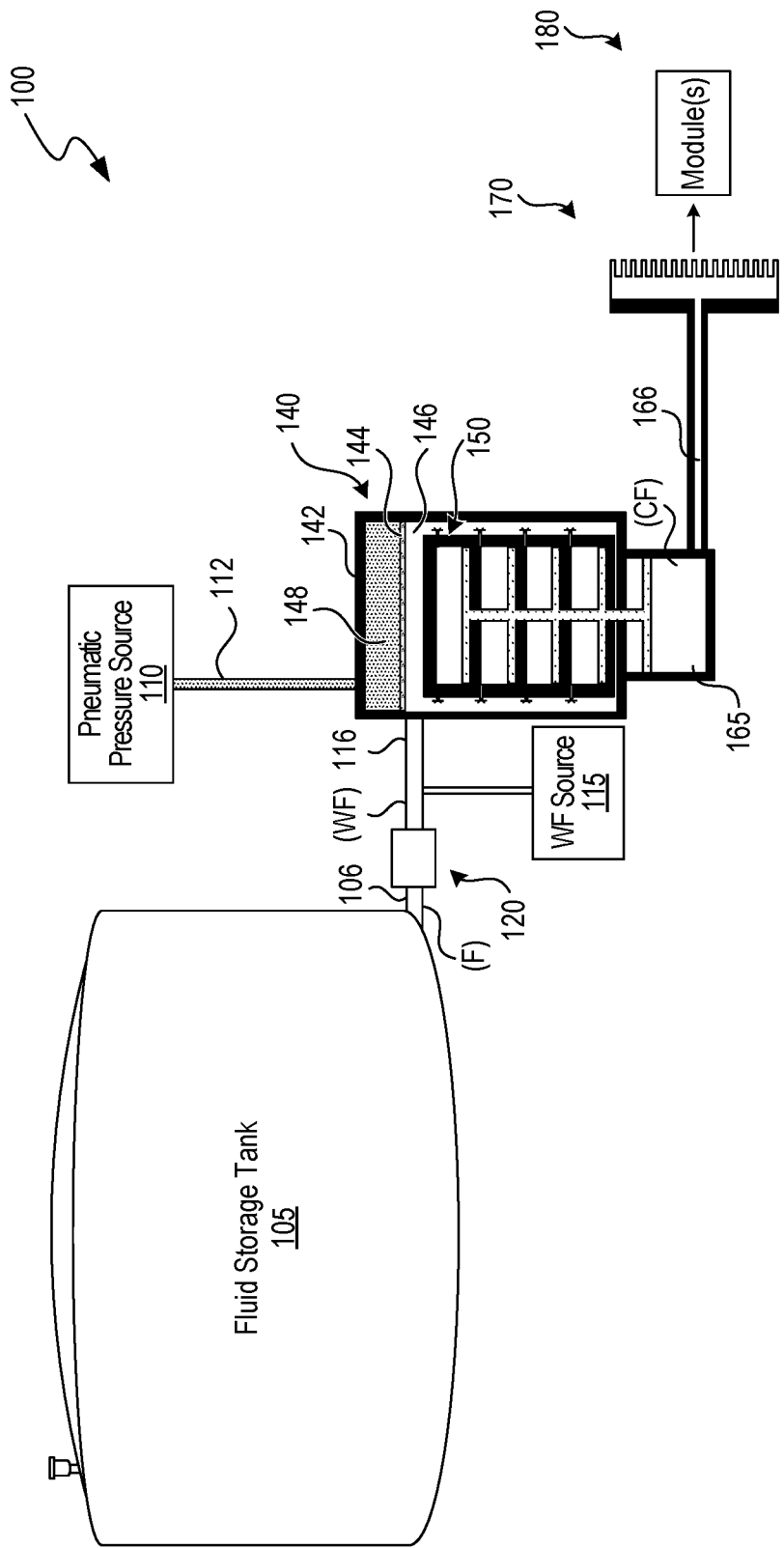
FIG. 1 is a schematic cross-sectional view of a system for utilizing hydrostatic pressure, in accordance with embodiments of the present technology.

A person skilled in the relevant art will understand that the features shown in the drawings are for purposes of illustrations, and that variations, including different and/or additional features and arrangements thereof, are possible.

DETAILED DESCRIPTION

A. Overview

The hydraulic pressure and/or potential energy of fluid in industrial storage tanks (e.g., at oil and gas facilities, manufacturing plants, etc.) are often under-utilized or not utilized at all, and as a result the energy associated with the fluid and/or storage tank is wasted. Embodiments of the present technology address at least some of these issues via a system that utilizes the hydrostatic and hydraulic pressure to generate energy and/or perform other useful functions. For example, embodiments of the present technology include a system comprising a storage tank containing a fluid, a separator piston, and a pressure intensifier having a first compartment and a second compartment. The separator piston includes a cylinder, and a piston member movable within the cylinder. The piston member within the cylinder defines a first separator compartment fluidically coupled to a bottom portion of the storage tank, and a second separator compartment fluidically coupled to the second compartment of the pressure intensifier. The pressure intensifier further includes a pressure concentrator in the second compartment and a compression chamber downstream of the pressure concentrator. The pressure concentrator can include a housing, a piston head member having arms, a plurality of cylinders each at least partially defined by the housing and the arms of the piston head member, and a drive piston head portion. The drive piston head portion is adjacent to the compression chamber and is configured to apply thereto a pressure equal to the sum of the individual pressures applied via the arms of the piston head member. Each of the cylinders can include a first compartment configured to contain a working fluid, a second compartment spaced apart from the first compartment, and a biasing member applying a force against a corresponding arm of the piston head member in a direction away from the compression chamber. In operation, hydrostatic pressure from the fluid of the storage tank is applied via the separator piston to the second compartment of the pressure intensifier. Additionally, pressure from a pneumatic pressure source is applied to the first compartment of the pressure intensifier. In response to these applied pressures, the arms of the piston head member of the pressure intensifier can exert a pressure that is collectively applied to the drive piston head portion, which applies the collective pressure on to the compression chamber to generate a compressed fluid (CF). The compressed fluid (CF) can be used to perform multiple other useful functions, including processing products (e.g., food products), generating energy, and/or forming oxygen, hydrogen, and/or other compounds for energy harvesting. The uses of the compressed fluid (CF) are described in additional detail herein.

The systems, devices, and methods of embodiments of the present technology have multiple advantages over related conventional technologies. For example, systems configured in accordance with embodiments of the present technology can convert the potential energy of the fluid in storage tanks to usable energy and/or compounds that can be combusted without producing harmful emissions. In doing so, embodiments of the present technology can sustainably generate energy from a source that is otherwise being underutilized or not utilized.

Embodiments of the present technology can be utilized in multiple applications, including at oil and gas facilities, municipal sewage and water facilities, hydroelectric dams, manufacturing plants and systems, and the like. Additionally, embodiments of the present technology can be utilized in generally inaccessible areas, such as in the ocean or other deep bodies of water, which as described herein can enable certain aspects of the present technology to operate more efficiently and/or with less energy.

In the Figures, identical reference numbers identify generally similar, and/or identical, elements. Many of the details, dimensions, and other features shown in the Figures are merely illustrative of particular embodiments of the disclosed technology. Accordingly, other embodiments can have other details, dimensions, and features without departing from present technology. In addition, those of ordinary skill in the relevant art will appreciate that further embodiments of the various disclosed technologies can be practiced without several of the details described below.

B. Systems, Devices, and Methods for Utilizing Hydrostatic and Hydraulic Pressure to Generate Energy FIG. 1 is a schematic cross-sectional view of a system 100 for utilizing hydrostatic and hydraulic pressure, and/or converting hydrostatic pressure to usable energy, in accordance with embodiments of the present technology. The system 100 can include a fluid storage tank 105 containing a stored fluid (SF) (e.g., a fuel, chemical, or other liquid) that provides a hydrostatic pressure at a bottom portion of the tank 105 (e.g., of at least 20 psi, 30 psi, 40 psi, or 50 psi). The system 100 can further include a pneumatic pressure source 110 (e.g., a windmill, an ocean wave pneumatic generation device, etc.) and tank inlet conduit 112 extending from the pressure source 110 and/or other units of the system 100. As explained herein, the pressure source 110 is configured to provide pressurized gaseous fluid to a compartment of a pressure intensifier. As shown in FIG. 1, the tank 105 can include separator inlet conduit 106 coupled to the bottom portion of the tank 105.

The system 100 can further include a separator piston 120 fluidically coupled to the separator inlet conduit 106, and a pressure intensifier 140 coupled to the separator piston 120. The pressure intensifier 140 includes a housing 142, a first compartment 148 (e.g., an upper compartment), a second compartment 146 (e.g., a lower compartment), a base interface 144 between the first compartment 148 and the second compartment 146, a pressure concentrator 150 disposed within the second compartment 146, and a compression chamber 165 downstream of the pressure concentrator 150. The first compartment 148 is configured to receive a pressurized gaseous fluid (e.g., air) from the pressure source 110 via a pressure intensifier inlet conduit 112, and the second compartment 146 is configured to receive a working fluid (WF) (e.g., water) via a connecting conduit 116 fluidically coupled to the separator piston 120. The pressure concentrator 150 is configured to increase the pressure of the working fluid (WF) based on the pressure applied from the tank 105, including via the separator inlet conduit 106 and separator piston 120 from the bottom portion of the tank 105 and the pressure intensifier inlet conduit 112 from the top portion of the tank 105. In doing so, the pressure concentrator 150 can produce a compressed fluid (CF) in the compression chamber 165 of least 5,000 psi, 10,000 psi, 25,000 psi, 50,000 psi, or 100,000 psi. As explained elsewhere herein (e.g., with reference to FIGS. 3A and 3B), the pressure concentrator 150 can include a plurality of individual pistons that are configured to collectively increase the pressure of the working fluid (WF) (e.g., in the compression chamber 165). The system 100 can further include a WF source 115 fluidically coupled to the connecting conduit 116 extending between the second compartment 146 and the separator piston 120. In some embodiments, the WF source 115 can comprise a recycle line that recirculates water to and/or from the pressure intensifier 140 and/or other units of the system 100.

The system 100 can further include a manifold 170 downstream of and fluidically coupled to the compression chamber 165 of the pressure intensifier 140 via a manifold conduit 166, and one or more modules 180 downstream of the manifold 170. As explained elsewhere herein (e.g., with reference to FIG. 4), the manifold 170 can include a plurality of chambers configured to utilize the pressure of the compressed fluid (CF). For example, in some embodiments the chambers of the manifold 170 can depressurize the compressed fluid (CF) to produce a water vapor source and/or steam, which can be utilized via the modules 180 to generate hydrogen and/or oxygen gaseous products.

Figure 2:
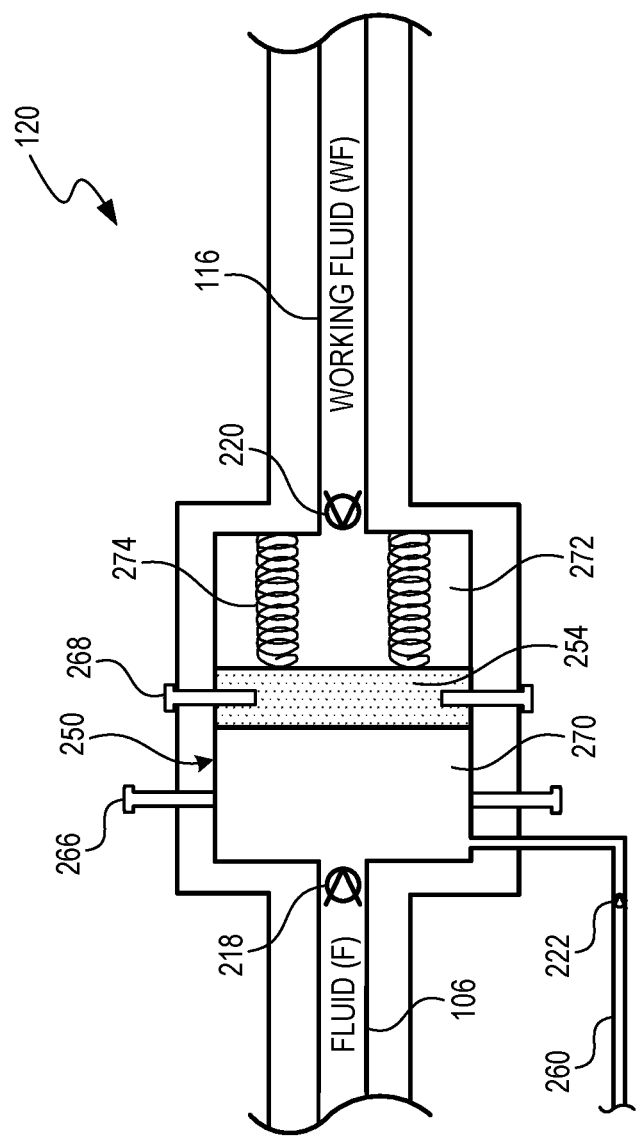
FIG. 2 is a schematic cross-sectional view of the separator piston of FIG. 1.

FIG. 2 is a schematic cross-sectional view of the separator piston 120 of FIG. 1. As shown in FIG. 2, the separator piston 120 includes a first separator compartment 270 fluidically coupled to the separator inlet conduit 106 extending from the tank 105 (FIG. 1) and configured to receive the stored fluid (SF), a second separator compartment 272 fluidically coupled to the connecting conduit 116 extending to the pressure intensifier 140 (FIG. 1) and configured to contain the working fluid (WF), and a separator piston member 254 between the first separator compartment 270 and the second separator compartment 272. The separator piston 120 can further include a biasing member 274 (e.g., a spring) within the second compartment 272 and configured to apply a biasing force on the separator piston member 254 in a direction away toward the first separator compartment 270 and/or away from the second separator compartment 272. The separator piston 120 can further include first and second separator shear pins 266, 268 configured to limit movement of the piston member 254 when engaged. The separator piston 120 is configured to transfer hydraulic pressure from the stored fluid (SF) in the separator inlet conduit 106 to the working fluid (WF) of the connecting conduit 116, without comingling the stored fluid (SF) with the working fluid (WF). In doing so, the separator 120 is able to utilize the pressure of the stored fluid (SF) without contaminating the working fluid (WF) that the pressure is effectively transferred to.

As shown in FIG. 2, the separator piston 120 can further include a separator inlet valve 218 at an inlet to the first separator compartment, a separator outlet valve 220 at an outlet from the second separator compartment 272, a pressure relief line 260 fluidically coupled to the first compartment 270 and configured to relieve pressure and/or fluid therein, and a pressure relief valve 222 on the pressure relief line 260. As described herein, the separator inlet valve 218, separator outlet valve 220, and the pressure relief valve 222 can be used to isolate the separator piston 120 from upstream and downstream sources (e.g., the tank 105 and the pressure intensifier 140) and remove fluid (F) from the first compartment 270.

Figure 3A:
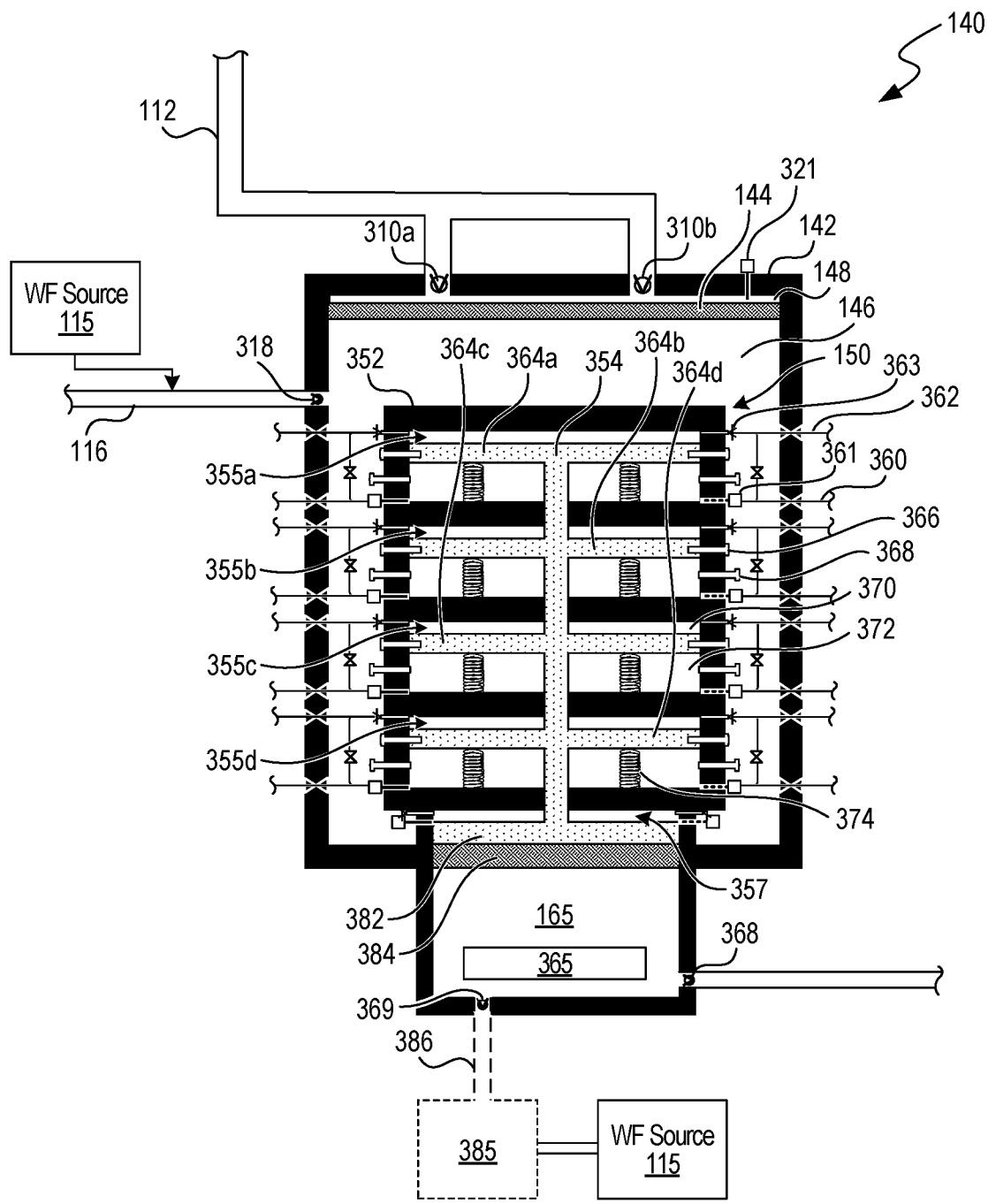
FIGS. 3A and 3B are schematic cross-sectional views of the pressure intensifier of FIG. 1.
Figure 3B:
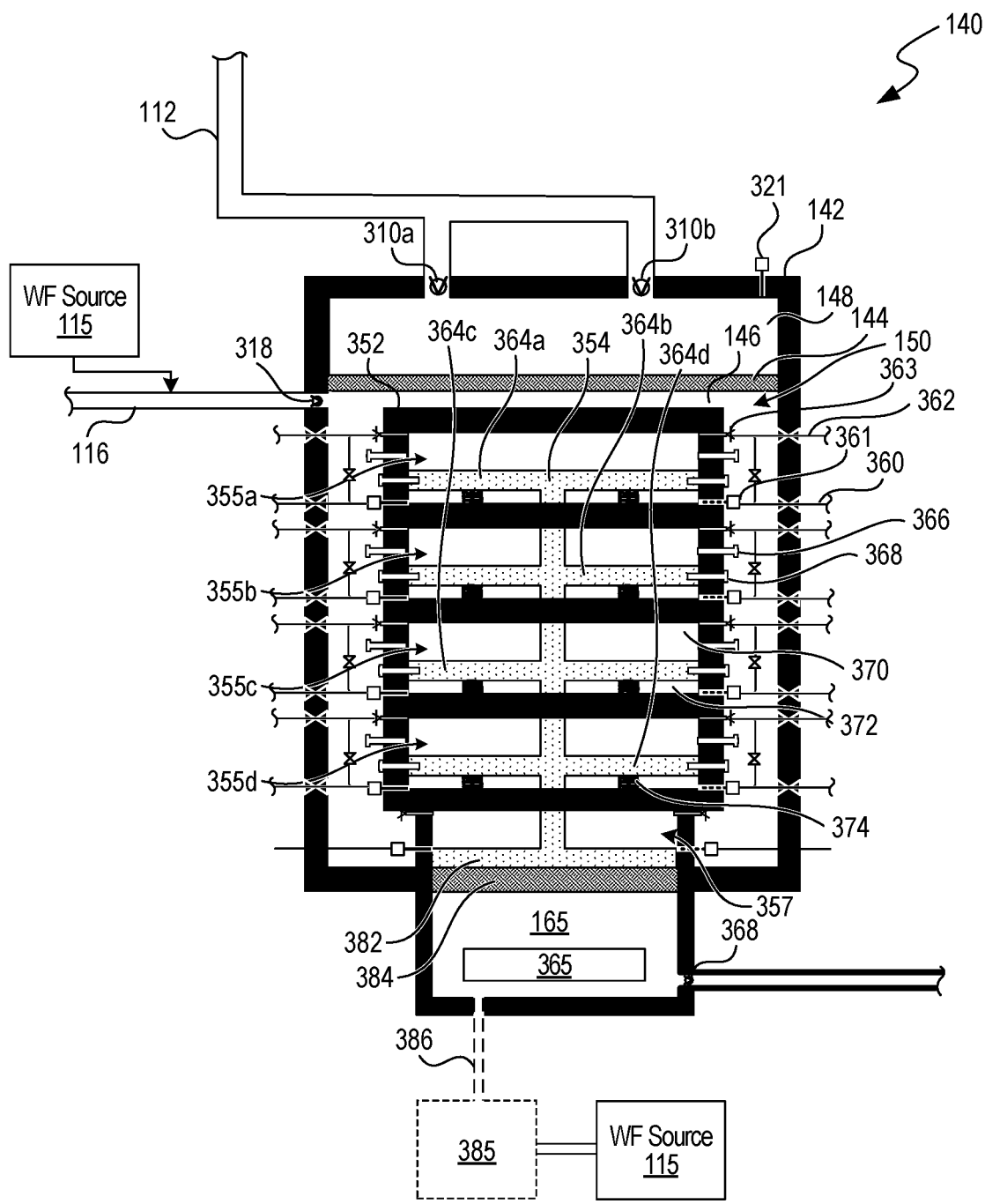

FIGS. 3A and 3B are schematic cross-sectional views of the pressure intensifier 140 of FIG. 1, in which the pressure intensifier 140 in FIG. 3A is in a depressurized (or less pressurized) state and the pressure intensifier 140 in FIG. 3B is in a pressurized (or more pressurized) state. Referring the FIGS. 3A and 3B together, and as previously described in FIG. 1, the pressure intensifier 140 includes the housing 142 defining an outer boundary of the pressure intensifier 140, the first compartment 148 fluidically coupled to the pressure intensifier inlet conduit 112, the second compartment 146 fluidically coupled to the connecting conduit 116, the pressure concentrator 150 within the second compartment 146, and the compression chamber 165 downstream of the pressure concentrator 150. The pressure intensifier inlet conduit 112 is configured to receive a pressurized gaseous fluid and can include one or more first inlet valves 310a-b to regulate the flow of gaseous fluid to and/or the pressure within the first compartment 148, and the connecting conduit 116 can include one or more second inlet valves 318 to regulate the flow of the working fluid (WF) to and/or the pressure within the second compartment 146. The base interface 144 is moveable within the housing 142 in response to pressure differentials between the first compartment 148 and the second compartment 146, e.g., to increase the volume of the first compartment 148 (and thereby decrease the volume of the second compartment 146) and decrease the volume of the first compartment 148 (and therein increase the volume of the second compartment 146). For example, a pressure increase in the first compartment 148 can cause the base interface 144 to move downward toward the pressure concentrator 150 to increase the volume of the first compartment 148 and decrease the volume (and thereby increase the pressure) of the second compartment 146.

The pressure concentrator 150 can include a housing 352, a piston head member 354 including arms 364a-d (collectively referred to as arms 364), a plurality of individual base cylinders 355a-d (collectively referred to as base cylinders 355) each at least partially defined by the housing 352 and corresponding arm 364 of the piston head member 354, and a drive cylinder 357 positioned at an end portion (e.g., below) the base cylinders 355. Each of the arms 364 of the piston head member 354 acting within the base cylinders 355 receive pressure from the working fluid (WF), and then transfers the pressure via the piston head member 354 to drive the piston head 382 which increases the pressure within the compression chamber 165. In such embodiments, the arms 364 of the piston head member 354, which can be a single component, act within the corresponding base cylinders 355 and the drive piston head portion 382 acts within the drive cylinder 357. As shown in FIGS. 3A and 3B, the drive piston head portion 382 can have a smaller cross-sectional dimension (e.g., diameter) than those of the individual arms 364, e.g., to increase the pressure applied to the compression chamber 165. In some embodiments, the cross-sectional dimension of the drive piston head portion 382 is equal to or larger than those of the individual arms 364, depending on the desired pressure to be applied via the drive piston head portion 382 to the compression chamber 165. As also shown in FIGS. 3A and 3B, the pressure concentrator 150 includes four cylinders 355, however in other embodiments the pressure concentrator 150 can include more or fewer base cylinders (e.g., 2, 6, 10, etc.), depending on the desired pressure to be applied to the compression chamber 165. Each of the base cylinders 355 can include, in addition to a corresponding portion of the piston head member 354, a first compartment 370 above the corresponding portion of the arms 364 of the piston head member 354, a second compartment 372 below the corresponding arms 364 of the piston head member 354, and a biasing member 374 (e.g., a spring) within the second compartment 372 and configured to apply a biasing force (e.g., an upward biasing force) on the corresponding arms 364 of the piston head member 354 in a direction away from the compression chamber 165. The individual base cylinders 355 can further include first and second piston shear pins 366, 368 configured to limit and/or enable movement of the piston head member 354 and/or the corresponding arms 364, a bleed line 360 fluidically coupled to the second compartment 372 via a pressure relief valve 361, and a fill line 362 fluidically coupled to the first compartment 370 via a working fluid (WF) valve 363.

As shown in FIGS. 3A and 3B, the pressure intensifier 140 can further include a drive interface 384 between the compression chamber 165 and a bottom face of the drive piston head portion 382 of the drive cylinder 357. As previously described, the pressure of the working fluid (WF) applies pressure to the drive piston 382 via each of the individual base cylinders 355. The drive piston 382 can exert a pressure equal to or approximately equal to (e.g., within 10%) the sum of the pressures provided by the individual pistons of piston head members 354. In some embodiments, the drive interface 384 can comprise a piezoelectric material or other related material configured to convert compression energy into electrical energy. For instance, in such embodiments comprising a piezoelectric material, the material can produce pulsed electrical current, which can be transferred via wires to a load for utilization, e.g., within the system 100.

In operation, the pressure intensifier 140 is configured to convert hydrostatic pressure from the stored fluid in the tank 105 (FIG. 1) and/or from the fluid pressure developed from the pneumatic pressure source 110 (FIG. 1) to the working fluid (WF) for further utilization. As previously noted, the pressure intensifier 140 is shown in FIG. 3A in a depressurized state and is shown in FIG. 3B is in a more pressurized state. Before hydraulic pressure from the stored fluid of the tank 105 (FIG. 1) is transferred to the pressure intensifier 140, the pressure intensifier 140 is filled with the working fluid (WF), e.g., via the working fluid (WF) source 115. As such, the second compartment 146 of the pressure intensifier 140, the first compartments 370 of the individual base cylinders 355, and the connecting conduit 116 up to the separator piston member 254 (FIG. 2) are fluidically coupled to and each filled with the working fluid (WF). As the pressure intensifier 140 is being filled with the working fluid (WF), (i) the first separator shear pins 266 (FIG. 2) hold the separator piston member 254 (FIG. 2) in place, and (ii) the first piston shear pins 366 hold the individual piston heads 354 in place, such that pressure from the stored fluid and/or tank 105 (FIG. 1) is not transferred to the pressure intensifier 140 while the pressure intensifier 140 is being filled with the working fluid (WF). The second compartments 372 of the individual base cylinders 355 are not filled with the working fluid (WF) and contain air. The air in the second compartments 372 of the individual base cylinders 355 is released via pressure relief valve 361, e.g., while the piston arm member 354 moves toward the compression chamber 165.

After the pressure intensifier 140 is filled with the working fluid (WF) and prior to applying the hydraulic pressure from the tank 105 (FIG. 1) or the pneumatic pressure from the pressure source 110 (FIG. 1) to the pressure intensifier 140, the base interface 144 can be positioned toward the top of the pressure intensifier 140 and the biasing members 374 can be uncompressed or slightly compressed state, as shown in FIG. 3A. Once the pressure intensifier 140 is filled with the working fluid (WF), the first separator shear pins 266 (FIG. 2) that hold the separator piston member 254 (FIG. 2) in place are released. In doing so, hydraulic pressure from the tank 105 (FIG. 1), or more specifically from the bottom portion of the tank 105 (FIG. 1), is applied to the pressure intensifier 140 via the separator piston 120 (FIG. 2). Once the pressure intensifier 140 reaches a pressure equilibrium with the connecting conduit 116, the separator piston 120 can be isolated from the pressure intensifier 140, e.g., by closing the second inlet valve 318. Additionally, the separator outlet valve 220 (FIG. 2) can be closed and the second separator shear pins 268 (FIG. 2) can engage the separator piston member 254 (FIG. 2).

Afterward, pneumatic pressure provided via the pressure intensifier inlet conduit 112, e.g., from the pressure source 110 (FIG. 1) is applied to the pressure intensifier 140, or more specifically to the portion of the base interface 144 exposed to the first compartment 148, by opening the first inlet valves 310a/b. As such pressure is applied, the base interface 144 is forced toward the pressure concentrator 150 and/or the compression chamber 165, thereby causing the pressure within the second compartment of the pressure intensifier 140 to increase. In some embodiments, pressure delivered from the pressure source 110 (FIG. 1) exceeds a pressure threshold in the first compartment 148 to move the drive interface 144 and/or the drive piston 382 against the compression chamber 165. After pressure from the pneumatic source 110 is sufficient to have enabled the first compartment 148 to overcome the threshold pressure in the second compartment 146, the first shear pins 366 are removed from the individual base cylinders 355, thereby enabling the portions of the piston head member 354 of each of the individual base cylinders 355 to move toward the compression chamber 165 and compress the corresponding biasing members 374, as shown in FIG. 3B. In doing so, the collective pressure within the individual base cylinders 355 can be transferred to the drive piston head portion 382, which pressurizes the compression chamber 165. Once the applied pressure of the pressure intensifier 140 has brought the compression chamber 165 to the desired pressure, second piston shear pins 368 can engage the portions of the piston head member 354 to hold the piston head member 382 in place, e.g., while other processes at the compression chamber 165 and the manifold 170 (FIG. 1) are carried out. In some embodiments, the compression chamber outlet valve 368 at the outlet of the compression chamber 165 can be closed after pressurization to enable simultaneous decompression into radiant energy transfer (RET) modules and/or eRET module reactors while products of pressurization are processing in and/or from the compression chamber 165. The compressed fluid (CF) in the compression chamber 165 is fluidically isolated from the working fluid (WF) in the second compartment 146.

In some embodiments, the pressure intensifier 140 can include a preheater 385 (e.g., a solar preheater) that utilizes solar energy to preheat fluid before compression in the compressed fluid (CF). The preheater 385 can include a heat exchanger and/or can be in fluid communication with the compressed fluid (CF) of the compression chamber 165 via preheater conduit 386. Preheating the fluid before becoming compressed fluid (CF) can increase the energy extracted from the compressed fluid (CF), thereby enabling downstream units and/or processes to produce additional energy.

In some embodiments, the pressure intensifier 140 can include a package 365 comprising products to be pressurized (e.g., food, equipment, parts, materials, etc.) that can be beneficially processed via the high pressures of the compressed fluid (CF). For example, the package 365 in the compression chamber 165 can enable high pressure food processing, biomass conversion (e.g., to biocrude), hydroforming of parts and materials, synthetic diamond production, expanding windmill output capacity, and/or electricity generation (e.g., for piezoelectric materials). The package 365 can be contained within compression chamber 165, or can be external to the compression chamber 165 and fluidically coupled to the compression chamber 165. The package 365 can facilitate pretreating of biomass, e.g., for conversion into green hydrocarbon fuels, high pressure food processing, hydroforming of parts and materials, synthetic diamond production, and potentially many other products of pressurization.

Once the individual piston head portions of the individual base cylinders 355 have reached the bottom of their travel, as shown in FIG. 3B, the pressure intensifier 140 and the separator piston 120 (FIG. 2) can be depressurized and re-set so the pressurization cycle can be run again for a new cycle. To re-set the pressurization cycle, the second inlet valve 318 can be opened to allow the working fluid (WF) to fill the second compartment 146. The separator piston 120 (FIG. 2) can be isolated (e.g., the from the storage tank 105 (FIG. 1) and pressure intensifier 140) by closing separator inlet and outlet valves 218, 220, and the pressure in the separator piston 120 can be relieved via pressure relief valve 222. In doing so, the separator piston head member 254 can be reset to its initial (e.g., depressurized) position. As the separator piston member 254 is reset and moves toward closed separator inlet valve 218, fluid within the first separator compartment 270 is removed from the system 100, e.g., via pressure relief line 260. Once the separator piston member 254 is reset to its starting or unpressurized position, the pin 266 can engage the separator piston member 254 and the pressure relief valve 222 can be closed.

For the pressure intensifier 140, the air pressure in the second compartments 372 of the individual base cylinders 355 is first relieved, e.g., via the corresponding pressure relief valves 361 and pressure relief lines 360. Subsequently, the first compartments 370 and the second compartments 372 of the individual base cylinders 355 can be equalized, thereby causing the working fluid (WF) to flow to the second compartments 372, which were previously filled with air, from the first compartments 370. After the first compartments 370 and the second compartments 372 of the individual base cylinders 355 are filled with the working fluid (WF), the shear pins 368 can be released and disengaged from the base piston head portions, thereby causing piston head member 354 within the individual base cylinders 355 and/or pressure concentrator 150 to move to its starting (e.g., default or unpressurized) position. At this point, the compression chamber 165 is considered depressurized. In the default position, the first piston shear pins 366 can engage the base piston head portions. Additionally, the first inlet valves 310a-b of the first compartment 148 of the pressure intensifier 140 are closed and the pressure in the first compartment 148 is relieved, e.g., via first compartment pressure relief valve 321. The working fluid (WF) in the second compartments 372 of the individual base cylinders 355 can be removed, via pumps (not shown) or other means. At this point, the pressurization cycle of the pressure intensifier 140, as described herein, can begin again.

Figure 4:
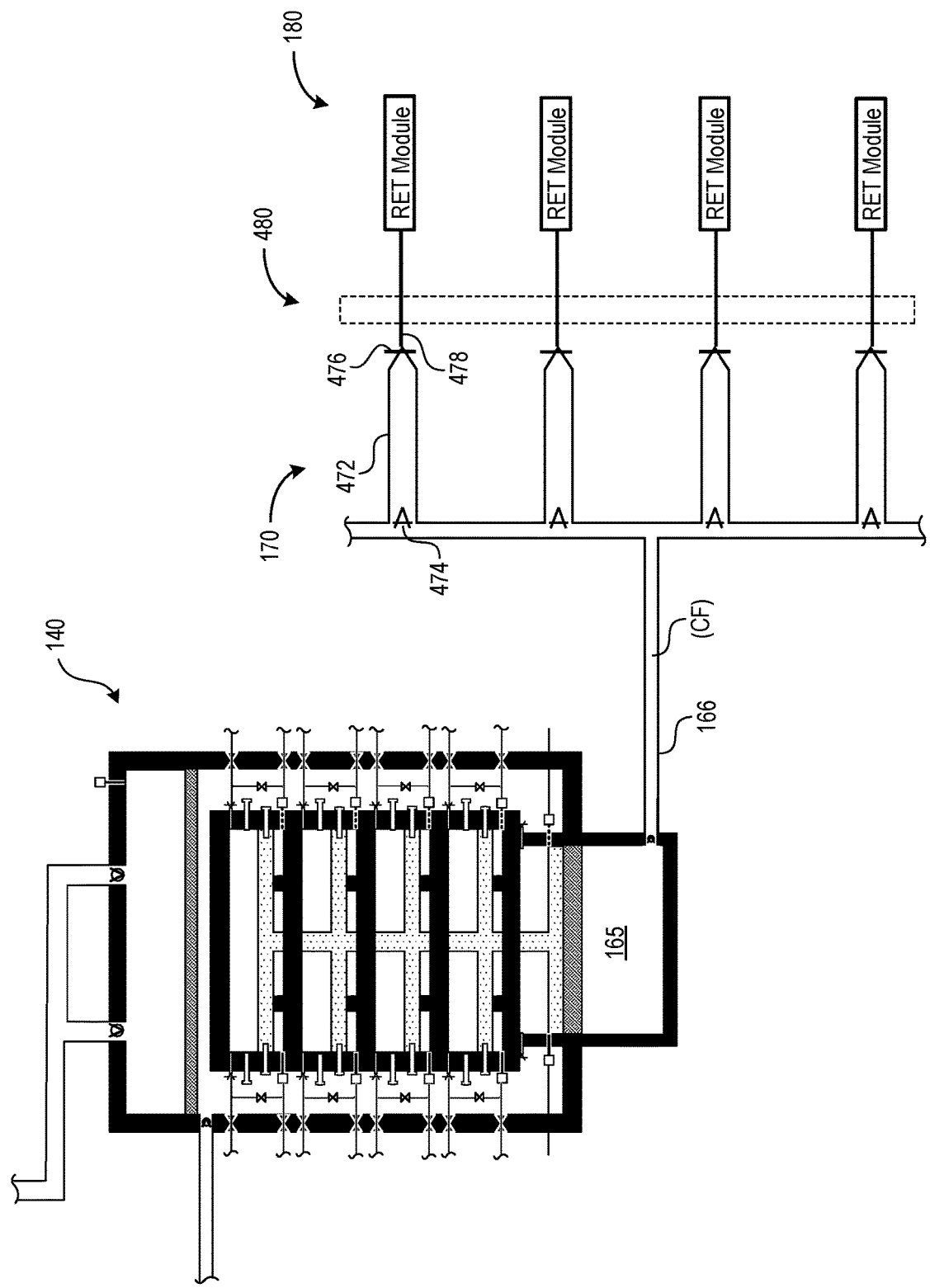
FIG. 4 is a schematic cross-sectional view of the manifold and modules of FIG. 1.

FIG. 4 is a schematic cross-sectional view of the manifold 170 of FIG. 1. As shown in FIG. 4, the manifold 170 is positioned to receive the compressed fluid (CF) from the compression chamber 165 of the pressure intensifier 140 via compression chamber conduit 166. The manifold 170 can include one or more chambers 472 (e.g., at least 10 chambers, 50 chambers, 100 chambers, or 200 chambers) each having a channel inlet valve 474 and a channel outlet valve 476, such that individuals chambers 472 can be isolated from the other chambers 472 and the conduit 166. The individual chambers 472 can have a cylindrical shape, a diameter of no more than one inch (e.g., 0.25 inch, 0.5 inch, or 0.75 inch), and/or a length of at least two inches (e.g., 3 inches, 4 inches, 5 inches, or 10 inches). Pressure within the individual chambers 472 can be at least 1,000 psi, 3,000 psi, 5,000 psi, 10,000 psi, 50,000 psi, or 100,000 psi. The manifold 170 can further include a plurality of channels 478, each downstream of a corresponding chamber 472. The individual channels 478 can have a smaller cross-sectional dimension (e.g., diameter) than that of the chambers 472, and in some embodiments can be fine bore friction channels comprising graphene, carbon nano tubes, and/or carbon nano materials. In some embodiments, individual channels 478 can have an interior circular-profile diameter of no more than 1 inch (e.g., 0.25 inch or 0.5 inch). The compressed fluid (CF) flowing through the channels 478 can depressurize and/or generate heat, causing the compressed fluid (CF) to vaporize and form steam which can be utilized to produce additional work. For example, in some embodiments a mechanical conversion device or system 480 ("conversion device 480") can be integrated within the manifold 170 and utilized to convert the energy in the steam to electricity or mechanical work. The conversion device 480 can be constructed in accordance with state-of-the-art impeller type steam to rotational energy conversion devices, or such that the steam vapor discharged from the channels 478 drives the conversion devices 480 into rotational motion.

Steam vapor can discharge from the conversion device 480 to the reactor modules 180 positioned downstream of the manifold 170. As such, the reactor modules 180 can be configured to receive the decompressing fluid (previously the compressed fluid (CF)), which at that point may include water vapor or steam. In some embodiments, the reactor modules 180 can include RET modules and/or eRET modules configured to disassociate the steam and/or compressed fluid (CF), e.g., into hydrogen ($H_2$) and oxygen ($O_2$). In such embodiments, the disassociated products can be further utilized, e.g., by directing them to fuel cells and/or combusting them for energy generation.

Figure 5:
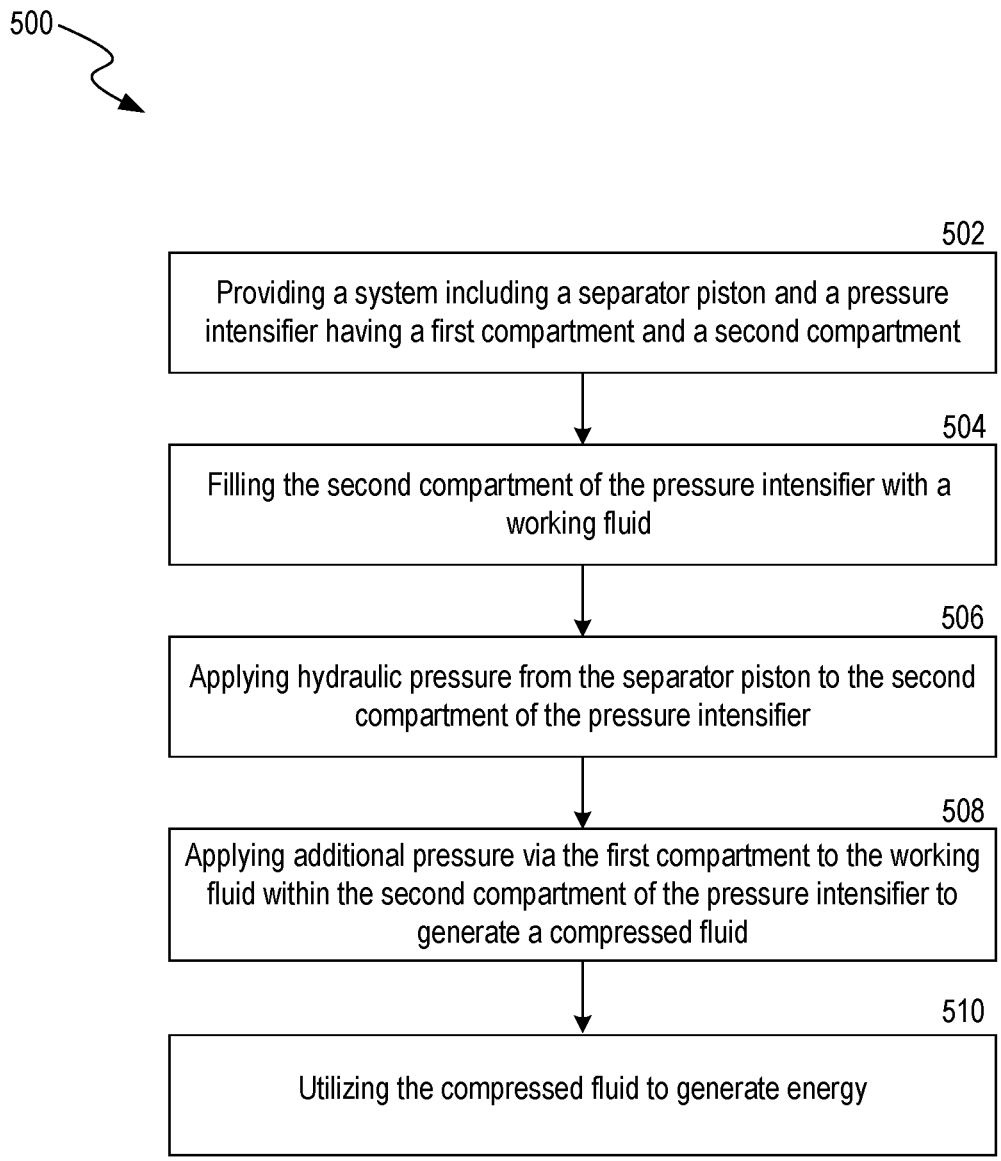
FIG. 5 is a block flow diagram of a method for utilizing hydrostatic and hydraulic pressure, in accordance with embodiments of the present technology.

FIG. 5 is a block flow diagram of a method 500 for utilizing hydrostatic and hydraulic pressure to generate energy, in accordance with embodiments of the present technology. The method 500 includes providing a system (e.g., the system 100; FIG. 1) including a separator piston (e.g., the separator piston 120; FIGS. 1 and 2) and a pressure intensifier (e.g., the pressure intensifier 140; FIGS. 1, 3A, and 3B) having a first compartment (e.g., the first compartment 148; FIGS. 1, 3A, and 3B) and a second compartment (e.g., the second compartment 146; FIGS. 1, 3A, and 3B) (process portion 502). The separator piston can include a first separator compartment (e.g., the first separator compartment 270; FIG. 2) fluidically coupled to a bottom portion of a storage tank (e.g., the tank 105; FIG. 1) having a hydraulic pressure, and a second separator compartment (e.g., the second separator compartment 272; FIG. 2) fluidically coupled to the pressure intensifier and fluidically isolated from the first separator compartment. The pressure intensifier can include a pressure concentrator (e.g., the pressure concentrator 150; FIGS. 1, 3A, and 3B) including a housing (e.g., the housing 352; FIGS. 3A and 3B), a piston head member (e.g., the piston head member 354; FIGS. 3A and 3B), a plurality of base cylinders (e.g., the base cylinders 355; FIGS. 3A and 3B) at least partially defined by the housing and the piston head member, and a drive piston head portion (e.g., the drive piston head portion 382; FIGS. 3A and 3B) abutting a compression chamber (e.g., the compression chamber 165; FIGS. 1, 3A, 3B, and 4). Each of the cylinders can include a first compartment (e.g., the first compartment 370; FIGS. 3A and 3B), a second compartment (e.g., the second compartment 372; FIGS. 3A and 3B) spaced apart from the first compartment of the corresponding piston, and a biasing member (e.g., the biasing member 374; FIGS. 3A and 3B) exerting a force against the portion of the piston head member in a direction toward the first compartment of the corresponding piston.

The method 500 further comprises filling the second compartment of the pressure intensifier with a working fluid (WF) (process portion 504). The working fluid (WF) (e.g., water) can be supplied via a working fluid source (e.g., the working fluid source 115; FIG. 1), e.g., positioned at a conduit extending between the pressure intensifier and the second separator compartment of the separator piston. The pressure intensifier can be isolated from the working fluid source, e.g., via the second inlet valve 318 on the connecting conduit 116. Filling the second compartment can include filling the entire area of the second compartment outside of the pressure concentrator, and the first compartments of the pistons of the pressure concentrator. The second compartments of the pistons of the pressure concentrator are not filled with the working fluid and instead contain air, which is released during operation of the pressure concentrator and/or pressure intensifier. The first compartments of the pressure concentrator can be filled via working fluid (WF) fill lines.

In some embodiments, as the second compartment of the pressure intensifier is filled with the working fluid (WF), the separator piston member (e.g., the separator piston member 254; FIG. 2) is locked in place, e.g., via separator shear pins (e.g., the second separator shear pin 266; FIG. 2), such that the separator piston member is prevented from moving within the separator piston and thereby prevented from transferring the pressure of the fluid in the first separator compartment to the second separator compartment, which is or can be fluidically coupled to the second compartment of the pressure intensifier. Additionally, the portions of the piston head member that form the piston head for each of the individual pistons can be locked in place, e.g., via first piston shear pins (e.g., the first piston shear pin 366; FIGS. 3A and 3B), such that the piston head member is prevented from moving within the pressure intensifier during the filling.

The method 500 further comprises applying hydraulic pressure from the separator piston to the second compartment of the pressure intensifier (process portion 506). Applying the hydraulic pressure from the separator piston can comprise releasing the separator piston member from a locked position and/or disengaging the separator shear pin(s) from the separator piston member. In doing so, the higher pressure of the fluid in the first separator compartment forces the separator piston member toward the second separator compartment, thereby increasing the pressure of the working fluid (WF) in the second separator compartment and the pressure intensifier. Stated differently, the pressure in the pressure intensifier equalizes with the pressure of the fluid in the first separator compartment, which can correspond to the pressure from the bottom portion of the storage tank. After the pressures are equalized, the pressure intensifier can be isolated from the separator piston, e.g., by closing a valve (e.g., the second inlet valve 318; FIGS. 3A and 3B) of the inlet conduit extending from the separator piston to the second compartment of the pressure intensifier.

The method 500 further comprises applying additional pressure via the first compartment of the pressure intensifier to the working fluid (WF) within the second compartment of the pressure intensifier to generate a compressed fluid (CF), e.g., within the compression chamber (process portion 508). A source of the additional pressure of the first compartment can be a pneumatic pressure source (e.g., the pressure source 110; FIG. 1). In some embodiments, the pressure of the pneumatic pressure source is isolated from the first compartment of the pressure intensifier, e.g., via one or more valves (e.g., the first inlet valves 310*a-b*; FIGS. 3A and 3B). In such embodiments, applying the additional pressure from the pneumatic pressure source can comprise opening the one or more inlet valves such that the first compartment is fluidically coupled to the pneumatic pressure source. During or after applying the additional pressure to the working fluid (WF) within the second compartment, the portions of the piston head member that form the piston head for each of the individual pistons can be released, e.g., by disengaging the corresponding shear pins, such that the piston head member can move within the pressure intensifier in response to the pressure exerted via the hydraulic fluid pressure and/or the additional pressure from the first compartment of the pressure intensifier. Additionally, after the piston head member moves (e.g., downward toward the compression chamber) to a compressed position, the piston head member (e.g., the portions of the piston head member forming piston heads of individual pistons) can be locked in the compressed position. In doing so, the pressure applied via the pistons and/or the drive piston head portion is maintained, e.g., until the compression chamber is depressurized and/or the compressed fluid (CF) is released from the compression chamber.

The method 500 further comprises utilizing the compressed fluid (CF) to generate energy (process portion 510). As described herein, the system can include an interface (e.g., the interface 384; FIGS. 3A and 3B) within the compression chamber and configured to receive the pressure exerted via the arms of the piston head member. The interface can comprise a piezoelectric material. In such embodiments, utilizing the compressed fluid (CF) to generate energy can also comprise generating energy or current via the piezoelectric material.

As also described herein, the system can comprise a manifold (e.g., the manifold 170; FIGS. 1 and 4) comprising a plurality of chambers (e.g., the chambers 472; FIG. 4) and a plurality of friction channels (e.g., the friction channels 478; FIG. 4). In such embodiments, utilizing the compressed fluid (CF) from the compression chamber to transfer hydraulic pressure can comprise directing the compressed fluid (CF) to the chambers and the channels to decompress the compressed fluid (CF) to generate water vapor and/or steam. Moreover, the system can further comprise a plurality of modules (e.g., the modules 180; FIGS. 1 and 4) downstream of the channels that is configured to disassociate the steam into at least one of hydrogen or oxygen, which can be combusted and/or directed to electrochemical cells for electricity generation.

In some embodiments, the method 500 can further include depressurizing the second compartment of the pistons of the pressure intensifier by fluidically isolating the pressure intensifier from the separator piston and equalizing the pressures of the first compartments and the second compartments of each of the cylinders of the pressure concentrator. In doing so, pressurized air from the second compartments of the pistons is bled off and water fills the second compartments of the pistons. In doing so, the corresponding portions of the piston head member that form the piston heads for the pistons is forced upward and/or away from the compression chamber via the biasing members. In some embodiments, the piston member is constructed of a buoyant material which works in conjunction with the biasing members to float the piston member to its starting position. Additionally, the separator piston can be depressurized and the separator piston member can be locked in place.

The method 500 can further comprise recharging the system to prepare the system to be repressurized via the hydraulic pressure of the storage tank via the separator piston, as described with respect to process portion 506. In such embodiments, the fluid in the second compartments of the pistons can be removed such that the second compartments contain mainly air, and the piston shear pins can be disengaged from the piston head member to enable the biasing members to push the corresponding portions of the piston head member (e.g., upward) to uncompressed or less compressed positions. In such positions, the pressure intensifier can be filled with the working fluid (WF), if needed, as described herein for process portion 504. Once the system is recharged, the system can be repressurized to generate additional compressed fluid (CF) that can be decompressed through friction channels, orifices, and/or valves to generate frictional heat energy, as described herein for process portion 508.

C. Conclusion

It will be apparent to those having skill in the relevant art that changes may be made to the details of the above-described embodiments without departing from the underlying principles of the present disclosure. In some cases, well known structures and functions have not been shown or described in detail to avoid unnecessarily obscuring the description of the embodiments of the present technology. Although steps of methods may be presented herein in a particular order, other embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms "a," "an," and "the" include plural referents unless the context clearly indicates otherwise. Reference herein to "one embodiment," "an embodiment," "some embodiments" or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless otherwise indicated, all numbers expressing pressures and other numerical values used in the specification and claims, are to be understood as being modified in all instances by the term "approximately." Accordingly, unless indicated to the contrary, the numerical parameters set forth in the following specification and attached claims are approximations that may vary depending upon the desired properties sought to be obtained by the present technology. When used, the term "approximately" refers to values within +/−10% of the stated value. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of "1 to 10" includes any and all subranges between (and including) the minimum value of 1 and the maximum value of 10, i.e., any and all subranges having a minimum value of equal to or greater than 1 and a maximum value of equal to or less than 10, e.g., 5.5 to 10. Additionally, any qualifying terms at the beginning of a list of numbers should be interpreted to affect each of the numbers. For example, the phrase "at least 2, 4, 6, or 8" should be interpreted to mean "at least 2, at least 4, at least 6, or at least 8."

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Aspects of the present technology are described below, and various examples of the present technology are described as numbered clauses (1, 2, 3, etc.) for convenience. These clauses are provided as examples and do not limit the present technology. It is noted that any of the dependent clauses may be combined in any combination, and placed into a respective independent clause.

1. An industrial system for utilizing hydraulic pressure from a storage tank to generate energy, the system comprising:
   a storage tank containing fluid;
   a separator piston including a cylinder and a separator piston member movable within the cylinder, the separator piston member defining a first separator compartment configured to be fluidically coupled to a bottom portion of the storage tank, and a second separator compartment fluidically isolated from the first separator compartment, wherein the separator piston is configured to transfer pressure of the first separator compartment to the second separator compartment; and
   a pressure intensifier including—
      a first compartment configured to receive a gaseous fluid and configured to be fluidically coupled to a pressure source;
      a second compartment fluidically isolated from the first compartment and configured to be fluidically coupled to the second separator compartment of the separator piston, wherein the second compartment is configured to be filled with a working fluid;
      a base interface between and abutting the first compartment and the second compartment, the base interface being moveable within the pressure intensifier in response to a pressure change of the first compartment and/or the second compartment;
      a compression chamber fluidically isolated from the second compartment and configured to contain a compressed fluid; and
      a pressure concentrator within the second compartment of the pressure intensifier, the pressure concentrator including—
         a housing;
         a piston head member including arms;
         a plurality of base cylinders each defined at least in part by the housing of the pressure concentrator, wherein each of the base cylinders and the piston head member at least in part define a first compartment configured to contain the working fluid, and a second compartment spaced apart from the first compartment by the arms of the piston head member;
         a biasing member exerting a force against the corresponding arm of the piston head member in a direction toward the first compartment of the base cylinders; and
         a drive piston head portion,
         wherein, in operation—
            arms of the piston head member acting within the base cylinders are each configured to receive pressure from the working fluid, and
            the drive piston head portion is configured to exert, on the compressed fluid, a pressure approximately equal to the collective exerted pressures of the arms of the piston head member.

2. The system of any one of the clauses herein, further comprising a manifold coupled to the compression chamber, the manifold including a plurality of chambers and a plurality of friction channels downstream of the chambers, wherein each of the friction channels is fluidically coupled to a corresponding one of the chambers, and wherein, in operation, flow of the compressed fluid through the friction channels generates water vapor and/or steam.

3. The system of clause 2, further comprising one of more modules downstream of and fluidically coupled to the friction channels, wherein the one or more modules are configured to disassociate the generated water vapor and/or steam into at least one of hydrogen or oxygen.

4. The system of any one of the clauses herein, wherein the separator piston member is a single component and comprises the drive piston head portion.

5. The system of any one of the clauses herein, further comprising a heater positioned to heat fluid provided to the compression chamber.

6. The system of any one of the clauses herein, wherein the pressure the drive piston head portion is configured to exert on the compressed fluid is at least 50,000 psi or between 1,000-100,000 psi.

7. The system of any one of the clauses herein, wherein the pressure source is a pneumatic pressure source configured to provide a gaseous fluid to the first compartment of the pressure intensifier.

8. The system of any one of the clauses herein, further comprising a container having one or more products, wherein the container is in the compression chamber and is processed by the pressure of the compression chamber.

9. The system of any one of the clauses herein, further comprising an interface in the compression chamber and abutting the drive piston head portion, the interface comprising a piezoelectric material, wherein, in operation, the piezoelectric material generates a charge in response to the pressure applied via the drive piston member.

10. An industrial system for utilizing hydraulic pressure to generate energy, the system comprising:
   a pressure intensifier positioned to receive a working fluid having a pressure corresponding to a pressure of a fluid external to the pressure intensifier, the pressure intensifier including—
      a first compartment configured to receive a pressurized gaseous fluid;
      a second compartment fluidically isolated from the first compartment and configured to be filled with the working fluid;
      a base interface between and abutting the first compartment and the second compartment, the base interface being moveable within the pressure intensifier in response to a pressure change of the first compartment and/or the second compartment; and
      a compression chamber fluidically isolated from the second compartment and configured to contain a compressed fluid; and
      a pressure concentrator within the second compartment of the pressure intensifier, the pressure concentrator including— a housing;

a piston head member including arms;

a plurality of base cylinders each defined at least in part by the housing of the pressure concentrator, wherein each of the base cylinders and the piston head member at least in part define a first compartment configured to contain the working fluid, and a second compartment spaced apart from the first compartment of the corresponding piston by the arms of the piston head member, a biasing member exerting a force against the portion of the piston head member in a direction toward the first compartment of the corresponding piston; and a drive piston head portion, wherein, in operation, (i) the arms of the piston head member acting within the base cylinders are each configured to receive a pressure from the working fluid, and (ii) the drive piston head portion is configured to exert a pressure approximately equal to the collective exerted pressures of the arms of the piston head member; and a manifold downstream of and fluidically coupled to the compression chamber, the manifold including a plurality of chambers and a plurality of friction channels downstream of the chambers, wherein each of the friction channels is fluidically coupled to a corresponding one of the chambers, and wherein, in operation, flow of the compressed fluid through the channels generates water vapor and/or steam.

11. The system of any one of the clauses herein, further comprising one of more modules downstream of and fluidically coupled to the manifold, wherein the one or more modules are configured to disassociate the compressed fluid into hydrogen and oxygen.

12. The system of any one of the clauses herein, further comprising a container having one or more products, wherein the container is in the compression chamber and is processed by the pressure of the compression chamber.

13. The system of clause 12, further comprising an interface in the compression chamber and abutting the drive piston head portion, the interface comprising a piezoelectric material, wherein, in operation, the piezoelectric material generates a charge in response to the pressure applied via the drive piston member.

14. The system of any one of the clauses herein, further comprising:

a storage tank containing the fluid external to the pressure intensifier; and a separator piston, the separator piston including a cylinder and a separator piston member movable within the cylinder, the separator piston member defining a first separator compartment configured to be fluidically coupled to a bottom portion of the storage tank, and a second separator compartment fluidically isolated from the first separator compartment, wherein the separator piston is configured to transfer pressure of the first separator compartment to the second separator compartment.

15. The system of any one of the clauses herein, further comprising a separator piston, the separator piston including a cylinder and a separator piston member movable within the cylinder, the separator piston member defining a first separator compartment fluidically coupled to a bottom portion of the storage tank, and a second separator compartment fluidically isolated from the first separator compartment, wherein the separator piston is configured to transfer pressure of the first separator compartment to the second separator compartment.

16. A method for utilizing hydrostatic and/or hydraulic pressure to generate energy, the method comprising:

providing a system including a separator piston and a pressure intensifier positioned to receive a working fluid, the separator piston including a cylinder and a separator piston member movable within the cylinder, the separator piston member defining a first separator compartment, and a second separator compartment fluidically isolated from the first separator compartment, wherein the separator piston is configured to transfer pressure of the first separator compartment to the second separator compartment, the pressure intensifier including— a first compartment;

a second compartment fluidically isolated from the first compartment;

a base interface between and abutting the first compartment and the second compartment;

a pressure concentrator within the second compartment of the pressure intensifier, the pressure concentrator including a housing, a piston head member including arms, a plurality of base cylinders each defined at least in part by the housing, and a plurality of biasing members in a corresponding one of the base cylinders, wherein— each of the base cylinders and the arms of the piston head member at least in part define a first compartment and a second compartment spaced apart from the first compartment, the arms of the piston head member acting within the base cylinders receive a force from the working fluid in the first compartment of each of the base cylinders, and each of the biasing members exert a force against the corresponding arms of piston head member in a direction toward the corresponding first compartment; and a compression chamber fluidically isolated from the second compartment, wherein the drive piston head portion abuts the compression chamber;

filling the second compartment of the pressure intensifier and the first compartments of the pistons with a working fluid;

applying, via the separator piston, a hydraulic force to the working fluid within the pressure intensifier;

applying, via the first compartment of the pressure intensifier, additional pressure to the second compartment of the pressure intensifier, thereby causing the drive piston head portion to compress the fluid within the compression chamber and generate a compressed fluid, wherein the pressure exerted via the drive piston head portion is approximately equal to the sum of the pressures exerted via the pistons; and utilizing the compressed fluid to generate energy.

17. The method of any one of the clauses herein, wherein the system further comprises a manifold including a plurality of chambers and a plurality of channels downstream of the chambers, wherein each of the friction channels is fluidically coupled to a corresponding one of the chambers, and wherein utilizing the compressed fluid comprises directing the compressed fluid through the friction channels to generate water vapor and/or steam.

18. The method of clause 17, wherein the system further comprises a plurality of modules downstream of the channels, the method further comprising directing the generated steam and/or water vapor through the plurality of modules to disassociate the steam into at least one of hydrogen or oxygen.

19. The method of any one of the clauses herein, wherein applying the additional pressure via the first compartment causes the piston head member to move toward the compression chamber and the pistons to compress the corresponding biasing members, and wherein utilizing the compressed fluid comprises depressurizing the compression chamber, the method further comprising:
    depressurizing the second compartment of the pressure intensifier by fluidically isolating the pressure intensifier from the separator piston and equalizing the pressures of the first compartments and the second compartments of each of the cylinders; and
    recharging the pressure intensifier and applying the hydraulic pressure to the working fluid within the pressure intensifier via the separator piston.

20. The method of any one of the clauses herein, wherein, prior to applying the additional pressure, the portions of the piston head members for the pistons are locked in place via shear pins, the method further comprising, after applying the hydraulic and before applying the additional pressure, disengaging the shear pins such that the portions of the piston head members are free to move in response to the additional pressure.

I claim:

1. An industrial system for utilizing hydrostatic pressure from a storage tank to generate energy, the system comprising:
    a storage tank containing fluid;
    a separator piston including a cylinder and a separator piston member movable within the cylinder, the separator piston member defining a first separator compartment configured to be fluidically coupled to a bottom portion of the storage tank, and a second separator compartment fluidically isolated from the first separator compartment, wherein the separator piston is configured to transfer pressure of the first separator compartment to the second separator compartment; and
    a pressure intensifier including—
        a first compartment configured to receive a gaseous fluid and configured to be fluidically coupled to a pressure source;
        a second compartment fluidically isolated from the first compartment and configured to be fluidically coupled to the second separator compartment of the separator piston, wherein the second compartment is configured to be filled with a working fluid;
        a base interface between and abutting the first compartment and the second compartment, the base interface being moveable within the pressure intensifier in response to a pressure change of the first compartment and/or the second compartment;
        a compression chamber fluidically isolated from the second compartment and configured to contain a compressed fluid; and
        a pressure concentrator within the second compartment of the pressure intensifier, the pressure concentrator including—
            a housing;
            a piston head member including arms;
            a plurality of base cylinders each defined at least in part by the housing of the pressure concentrator, wherein each of the base cylinders and the corresponding arm of the piston head member at least in part define a first compartment configured to contain the working fluid, and a second compartment spaced apart from the first compartment by the corresponding arm of the piston head member;
            a biasing member exerting a force against the corresponding arm of the piston head member in a direction toward the corresponding first compartment of the base cylinders; and
            a drive piston head portion,
    wherein, in operation—
        the arms of the piston head member acting within the base cylinders are each configured to receive a pressure from the working fluid, and
        the drive piston head portion is configured to exert, on the compressed fluid, a pressure approximately equal to the collective exerted pressures of the arms of the piston head member.

2. The system of claim 1, further comprising a manifold coupled to the compression chamber, the manifold including a plurality of chambers and a plurality of friction channels downstream of the chambers, wherein each of the friction channels is fluidically coupled to a corresponding one of the chambers, and wherein, in operation, flow of the compressed fluid through the channels generates steam and/or water vapor.

3. The system of claim 2, further comprising one or more modules downstream of and fluidically coupled to the friction channels, wherein the one or more modules are configured to disassociate the generated steam and/or water vapor into at least one of hydrogen or oxygen.

4. The system of claim 1, wherein the piston head member is a single component and comprises the drive piston head portion.

5. The system of claim 1, further comprising a heater positioned to heat fluid provided to the compression chamber.

6. The system of claim 1, wherein the pressure the drive piston head portion is configured to exert on the compressed fluid is between 3,000-100,000 psi.

7. The system of claim 1, wherein the pressure source is a pneumatic pressure source configured to provide the gaseous fluid to the first compartment of the pressure intensifier.

8. The system of claim 1, further comprising a container having one or more products, wherein the container is in the compression chamber and is processed by the pressure of the compression chamber.

9. The system of claim 1, further comprising an interface in the compression chamber and abutting the drive piston head portion, the interface comprising a piezoelectric material, wherein, in operation, the piezoelectric material generates a charge in response to the pressure applied via the drive piston head portion.

10. An industrial system for utilizing hydraulic pressure to generate energy, the system comprising:
    a pressure intensifier positioned to receive a working fluid having a pressure corresponding to a pressure of a fluid external to the pressure intensifier, the pressure intensifier including—
        a first compartment configured to receive a pressurized gaseous fluid;
        a second compartment fluidically isolated from the first compartment and configured to be filled with the working fluid;
        a base interface between and abutting the first compartment and the second compartment, the base interface being moveable within the pressure intensifier in response to a pressure change of the first
compartment and/or the second compartment;
a compression chamber fluidically isolated from the
second compartment and configured to contain a
compressed fluid; and
a pressure concentrator within the second compartment
of the pressure intensifier, the pressure concentrator
including—
a housing;
a piston head member including arms;
a plurality of base cylinders each defined at least in
part by the housing of the pressure concentrator,
wherein each of the base cylinders and the corresponding arm of the piston head member at least
in part define a first compartment configured to
contain the working fluid, and a second compartment spaced apart from the first compartment by
the corresponding arm of the piston head member,
a biasing member exerting a force against the corresponding arm of the piston head member in a
direction toward the first compartment of the
corresponding arm; and
a drive piston head portion,
wherein, in operation, (i) the arms of the piston head
member acting within the base cylinders are each
configured to receive a pressure from the working
fluid, and (ii) the drive piston head portion is
configured to exert a pressure approximately equal
to the collective exerted pressures of the arms of
the piston head member; and
a manifold downstream of and fluidically coupled to the
compression chamber, the manifold including a plurality of chambers and a plurality of friction channels
downstream of the chambers, wherein each of the
friction channels is fluidically coupled to a corresponding one of the chambers, and wherein, in operation,
flow of the compressed fluid through the channels
generates steam and/or water vapor.

11. The system of claim 10, further comprising one or more reactor modules downstream of and fluidically coupled to the manifold, wherein the one or more modules are configured to disassociate the compressed fluid into hydrogen and oxygen.

12. The system of claim 10, further comprising a container having one or more products, wherein the container is in the compression chamber and is processed by the pressure of the compression chamber.

13. The system of claim 12, further comprising an interface in the compression chamber and abutting the drive piston head portion, the interface comprising a piezoelectric material, wherein, in operation, the piezoelectric material generates a charge in response to the pressure applied via the drive piston head portion.

14. The system of claim 10, further comprising:
a storage tank containing the fluid external to the pressure intensifier; and
a separator piston, the separator piston including a cylinder and a separator piston member movable within the cylinder, the separator piston member defining a first separator compartment configured to be fluidically coupled to a bottom portion of the storage tank, and a second separator compartment fluidically isolated from the first separator compartment, wherein the separator piston is configured to transfer pressure of the first separator compartment to the second separator compartment.

15. The system of claim 10, further comprising a separator piston, the separator piston including a cylinder and a separator piston member movable within the cylinder, the separator piston member defining a first separator compartment fluidically coupled to a bottom portion of a storage tank, and a second separator compartment fluidically isolated from the first separator compartment, wherein the separator piston is configured to transfer pressure of the first separator compartment to the second separator compartment.

16. A method for utilizing hydrostatic and hydraulic pressure to generate energy, the method comprising:
providing a system including a separator piston and a pressure intensifier positioned to receive a working fluid, the separator piston including a cylinder and a separator piston member movable within the cylinder, the separator piston member defining a first separator compartment and a second separator compartment fluidically isolated from the first separator compartment, wherein the separator piston is configured to transfer pressure of the first separator compartment to the second separator compartment, the pressure intensifier including—
a first compartment;
a second compartment fluidically isolated from the first compartment;
a base interface between and abutting the first compartment and the second compartment;
a pressure concentrator within the second compartment of the pressure intensifier, the pressure concentrator including a housing, a piston head member including arms, a plurality of base cylinders each defined at least in part by the housing, a plurality of biasing members in corresponding ones of the base cylinders, and a drive piston head portion, wherein—
each of the base cylinders and the corresponding arm of the piston head member at least in part define a first compartment and a second compartment spaced apart from the first compartment,
the arms of the piston head member acting within the base cylinders receive a force from the working fluid in the first compartment of each of the base cylinders, and
each of the biasing members exert a force against the corresponding arms of the piston head member in a direction toward the corresponding first compartment; and
a compression chamber fluidically isolated from the second compartment of the pressure intensifier, wherein the drive piston head portion abuts the compression chamber;
filling the second compartment of the pressure intensifier and the first compartments of the arms of the piston head member with the working fluid;
applying, via the separator piston, a hydraulic pressure to the working fluid within the pressure intensifier;
applying, via the first compartment of the pressure intensifier, additional pressure to the second compartment of the pressure intensifier, thereby causing the drive piston head portion to compress a fluid within the compression chamber and generate a compressed fluid, wherein the pressure exerted via the drive piston head portion is approximately equal to the sum of the pressures exerted via the arms of the piston head member; and
utilizing the compressed fluid to generate energy.

17. The method of claim 16, wherein the system further comprises a manifold including a plurality of chambers and a plurality of friction channels downstream of the chambers, wherein each of the friction channels is fluidically coupled to a corresponding one of the chambers, and wherein utilizing the compressed fluid comprises directing the compressed fluid through the channels to generate steam and/or water vapor.

18. The method of claim 17, wherein the system further comprises a plurality of modules downstream of the friction channels, the method further comprising directing the generated steam and/or water vapor through the plurality of modules to disassociate the steam and/or water vapor into at least one of hydrogen or oxygen.

19. The method of claim 16, wherein applying the additional pressure via the first compartment of the pressure intensifier causes the piston head member to move toward the compression chamber and the arms of the piston head member to compress the corresponding biasing members, and wherein utilizing the compressed fluid comprises depressurizing the compression chamber, the method further comprising:

depressurizing the second compartment of the pressure intensifier by fluidically isolating the pressure intensifier from the separator piston and equalizing the pressures of the first compartments and the second compartments of each of the base cylinders; and recharging the pressure intensifier and applying the hydraulic pressure to the working fluid within the pressure intensifier via the separator piston.

20. The method of claim 16, wherein, prior to applying the additional pressure, the arms of the piston head member are locked in place via shear pins, the method further comprising, after applying the hydraulic pressure and before applying the additional pressure, disengaging the shear pins such that the arms of the piston head member are free to move in response to the additional pressure.

\* \* \* \* \*